(12) United States Patent
Gustafsson et al.

(10) Patent No.: US 8,339,976 B2
(45) Date of Patent: Dec. 25, 2012

(54) METHOD OF DETERMINING VIDEO QUALITY

(75) Inventors: Jörgen Gustafsson, Luleå (SE); Xiangchun Tan, Luleå (SE); Gunnar Heikkilä, Gammelstad (SE); Martin Pettersson, Märsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 12/443,712

(22) PCT Filed: Oct. 19, 2006

(86) PCT No.: PCT/SE2006/050410
§ 371 (c)(1), (2), (4) Date: Mar. 31, 2009

(87) PCT Pub. No.: WO2008/048155
PCT Pub. Date: Apr. 24, 2008

(65) Prior Publication Data
US 2010/0008241 A1   Jan. 14, 2010

(51) Int. Cl.
*G01R 31/08* (2006.01)
*G01D 15/16* (2006.01)
*B41J 2/38* (2006.01)

(52) U.S. Cl. ......... 370/252; 348/184; 348/185; 348/192
(58) Field of Classification Search ................. 370/241, 370/248, 252; 348/184, 185, 192
See application file for complete search history.

(56) References Cited

U.S. PATENT DOCUMENTS

| | | | |
|---|---|---|---|
| 7,599,307 B2 * | 10/2009 | Seckin et al. | 370/252 |
| 8,010,652 B2 | 8/2011 | Wang et al. | |
| 2003/0121053 A1 | 6/2003 | Honda | |
| 2003/0137966 A1 | 7/2003 | Odman et al. | |
| 2004/0156559 A1 | 8/2004 | Cheng | |
| 2005/0105802 A1 * | 5/2005 | Hekstra et al. | 382/199 |
| 2006/0245364 A1 * | 11/2006 | Zhu et al. | 370/241 |
| 2007/0088516 A1 * | 4/2007 | Wolf et al. | 702/81 |
| 2007/0133608 A1 * | 6/2007 | Isambart et al. | 370/484 |
| 2008/0215704 A1 * | 9/2008 | Curcio et al. | 709/217 |

FOREIGN PATENT DOCUMENTS

| | | |
|---|---|---|
| EP | 0869684 A2 | 10/1998 |
| EP | 1565875 | 6/2004 |
| EP | 1681864 A1 | 7/2006 |
| EP | 1763248 A1 | 3/2007 |
| JP | 2001268124 A | 9/2001 |

(Continued)

OTHER PUBLICATIONS

Petrov, O. "Video Quality Estimation, Subjective Video Quality Estimation." Mar. 22, 2006 (available at http://www.ixbt.com/divideo/estimate2.shtml). English translation attached.

*Primary Examiner* — Michael Thier
*Assistant Examiner* — Awet Haile
(74) *Attorney, Agent, or Firm* — Coats & Bennett, P.L.L.C.

(57) ABSTRACT

A method and a device utilizing an algorithm using measurement data derived from parameters related to a video-streaming player and/or parameters related to data transport is disclosed. The data are used as input data in a model designed to generate a value corresponding to the quality of the multimedia sequence, such as for example a MOS score.

30 Claims, 2 Drawing Sheets

FOREIGN PATENT DOCUMENTS

| | | |
|---|---|---|
| JP | 2006074333 | 3/2006 |
| JP | 2006507775 | 3/2006 |
| JP | 2006128972 | 5/2006 |
| JP | 2007536859 A | 12/2007 |
| RU | 2110162 C1 | 4/1998 |
| WO | 2005109821 A1 | 11/2005 |

* cited by examiner

METHOD OF DETERMINING VIDEO QUALITY

TECHNICAL FIELD

The present invention relates to a method and a device for determining the quality of a multimedia sequence.

BACKGROUND

New high performance radio networks have paved the way for new mobile services and applications. For example, many of the new services aim at enhancing the experience of a phone conversation; other services provide for transmission of video signals such as video-on-demand and other similar multimedia services. All such new services involving reception of any type of multimedia at a receiver require monitoring of the perceived received quality. This to ensure that users experience good quality and get the service they expect. In other words multimedia services such as video streaming quality perceived by the end user is one important service quality measurement for operators of all types of networks. Possible service problems need to be troubleshot.

The subjectively perceived video quality can be estimated with an objective video quality model. The video quality value can be a MOS (Mean Opinion Score) value or another suitable measure. MOS is the mean value of grades from a subjective test, where test persons grade a multimedia clip in a scale ranging from 1 for the poorest quality to 5 for the best quality.

Today, there exist a number of commercial tools for measuring and estimating multimedia quality. However, the products for determining video quality on the market today base their video quality estimation mostly on video image analysis. An approach based on video image analysis puts a high demand on the computational capacity of the tool used because the algorithms used in such analysis are in themselves very computationally demanding. This in turn makes it difficult to produce an output result in real-time.

Another problem encountered with existing solutions is that they are sensitive to change in context in the video signal because they typically base their output on an analysis between different frames of a video sequence in the case of an estimation of video quality.

Yet another problem with existing solutions, wherein original video is compared to a received video (so called full reference method), is the need for synchronization between consecutive frames in order to generate a meaningful output result.

There is therefore a need for a method that requires less computational power and which hence can be implemented in a device that is inexpensive to manufacture and easy to operate.

SUMMARY

It is an object of the present invention to overcome at least some of the problems associated with existing methods and tools for determining the quality of a multimedia sequence.

This object and others are obtained by a method and a device utilizing an algorithm using measurement data derived from input parameters related to a video-streaming player and/or parameters related to data transport. The multimedia sequence can be transmitted over any type of network, for example a radio network or a fixed network. The data are used as input data in a model designed to generate a value corresponding to the quality of the multimedia sequence, such as for example a MOS score. The method in accordance with the invention can advantageously be implemented by computer software in a computer program product.

Such an approach is significantly faster than methods based on video image analysis because the calculations required are much simpler. Typically they do not require any transformation into the frequency domain and the like.

Moreover, the exact synchronization needed for solutions requiring a reference as is the case for solutions based on a full reference video image analysis is not necessary, since a solution based on network parameters does not require a reference. Also, the calculated output, e.g. a MOS value, is not affected if the content is switched as would be the case in a model using image analysis.

BRIEF DESCRIPTION OF THE DRAWINGS

The present invention will now be described in more detail by way of non-limiting examples and with reference to the accompanying drawings, in which.

DETAILED DESCRIPTION

Figure 1:
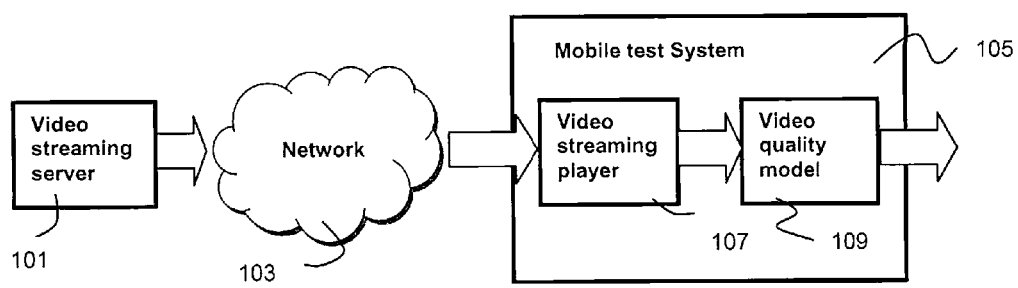
FIG. 1 is a general view of a system for streaming video

In FIG. 1, a general view of a system for measuring the received quality of a multimedia sequence in accordance with the present invention is depicted. The multimedia sequence is in the following example a video clip with associated audio. The system comprises a video streaming server 101. The video streaming server 101 is the source of a video sequence with associated audio transmitted over a network 103 as a video signal. The network 103 can for example be a radio network or any other network.

The video sequence transmitted over the network 103 is received by a mobile test system 105. The mobile test system 105 typically comprises a video streaming player 107 and a device 109 including a video quality model. The device 109 utilizes data obtained from the video streaming player 107 and from the transport layer in order to generate a value that is an estimation of a current end-user perceived video, audio or total quality.

Figure 2:
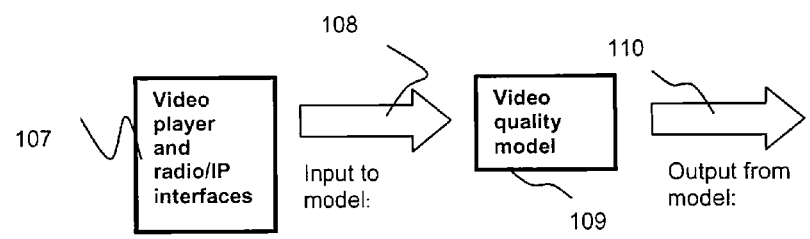
FIG. 2 is a closer view of some parts of the system shown in FIG. 1.

In FIG. 2, the mobile test system 105 is shown in more detail. The test system 105 is designed to upon reception of a video sequence estimate perceived video quality for video in a computational efficient way. The estimation is done by, in real-time, collecting measurement data from a video-streaming player (video streaming), and/or from data transport, in particular IP layer and above. The data is input and combined in a video quality estimation model and a video quality value is calculated (for example a MOS score).

The calculated output (MOS value) is an estimation of end-user perceived video and audio quality. The calculated MOS value is intended to be close to the result of a subjective test, where test persons view and grade a video clip. The total streaming quality (MOS value) is expressed as a function of the input variables. Both a linear and non-linear model can be used to estimate the MOS value. Also, a combination of linear and non-linear functions may be employed.

The model is then designed to predict one or many of:
Total quality
Video quality
Audio quality The perhaps most common video quality problems for mobile video streaming are high compression (due to low bandwidth over the network), video quality degradation due to packet loss, long initial buffering and re-buffering in the middle of a video. In a preferred embodiment the model takes into account all of these quality problems and the output, for example presented as a MOS value, then reflects the perceived video quality.

The input to the model includes a number of these measurement parameters. For example one or many of the following parameters may be utilized:

Audio Codec
Video Codec
Total coded bit rate
Video bit rate
Audio bit rate
Video frame rate
Packet loss rate
Length of initial buffering (as absolute or relative percent of video clip time)
Number of re-buffering events
Re-buffering frequency (similar to number of re-buffering events)
Start time of re-buffering event (as absolute time or relative percent of total clip time)
Length of re-buffering (as absolute time or relative percent of total clip time)
Data throughput
IP packet jitter
IP packet size
RTP/RTCP signaling
Buffer size of video client In different scenarios different parameters may prove to be more important than others when determining a video quality value. To give an example, in some applications the parameters corresponding to, the packet loss, the length of initial buffering, and the length of re-buffering in combination with information regarding the codec and the total coded bit rate have proven to give a good estimate of the video quality value. In such a scenario only a small sub-set of parameters are necessary in order to generate a good estimate of the current quality value. This is advantageous because the model can then be made simpler and hence the implementation in a device for generating a quality value can be faster and less expensive.

If one or many of the input parameters important to the situation at hand are not available, other parameters can be used to calculate the ones missing. Thus, if for example "Total coded bit rate" is not available, "Data throughput", "IP packet size" and "Buffer size of client" can be used to estimate the total coded bit rate. Buffering input parameters, such as "number of re-bufferings", "re-buffering frequency", "start time of re-buffering", "Length of initial buffering" and "length of re-buffering", can in the same manner be estimated based on total coded bit rate, throughput and knowledge about the multimedia player's buffer size. Other relationships may be used to estimate other important parameters. A combination effect of many parameters can be used to estimate the quality. For example, the combination effect of simultaneous packet loss and re-buffering can be used. The quality is not necessary a simple addition of quality degradation for packet loss and re-buffering. In fact, in some application the relationship is conceivably more complex and requires a more complex model in order to correctly model the perceived video quality.

The video quality model is tuned based on subjective tests, where test persons have viewed and graded video clips with long and short initial buffering and long and short middle buffering packet, various loss rates and potentially other quality degrading effects. Also the number of middle buffering may be varied to tune the model even better. Other ways to tune the model include tuning with help of other objective models, etc.

Figure 3:
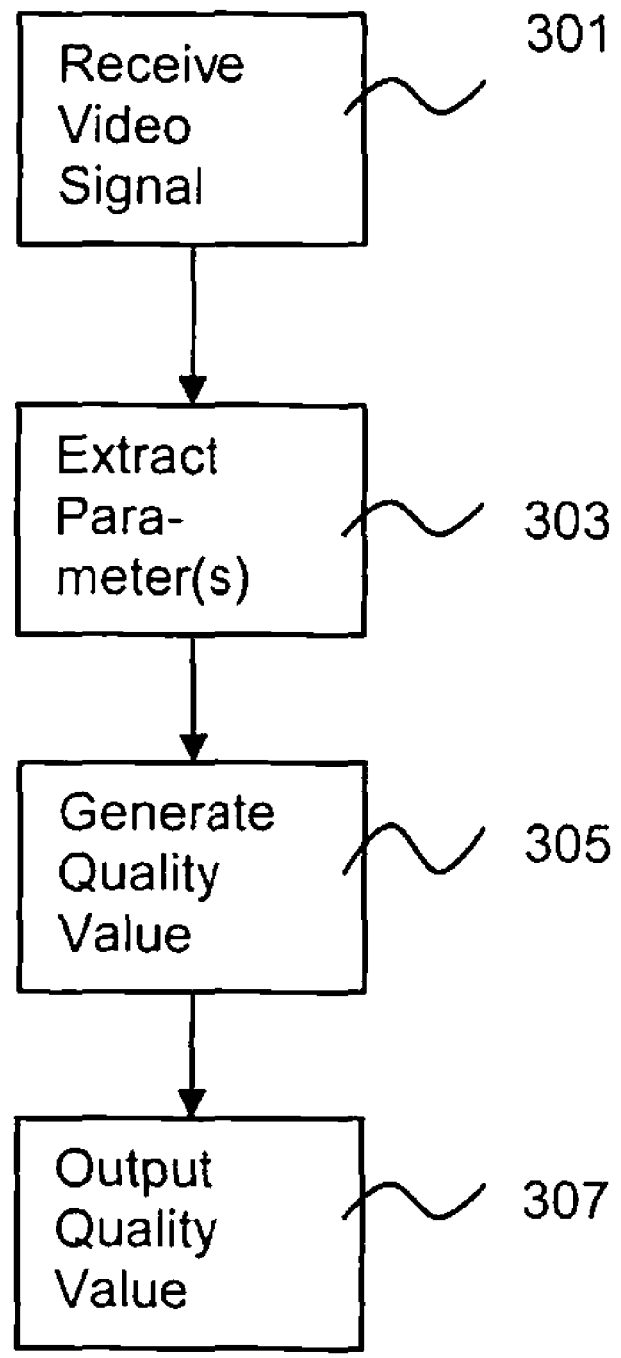
FIG. 3 is a flowchart illustrating different steps performed in a device for determining perceived multimedia quality

In FIG. 3 different steps performed in the video quality modeling device as described above are shown. Thus, first in a step 301 the video player receives a video signal representing a video sequence. The video sequence may or may not be associated with audio. Next, in a step 303, a number of data for different parameters relating to the received video signal and/or video player are transferred to the video quality modeling device. The data typically relate to one or many of the parameters listed above in conjunction to FIG. 2, e.g. Video Codec, Audio Codec, Total coded bit rate, Video bit rate, Audio bit rate, Video frame rate, Packet loss rate, Start time of re-buffering (as absolute time or relative percent of total clip time), Length of initial buffering (as absolute or relative percent of video clip time), Number of re-buffering events, Re-buffering frequency (similar to number of re-buffering events), Length of re-buffering (as absolute time or relative percent of total clip time), Data throughput, IP packet jitter, IP packet size, RTP/RTCP signaling, Buffer size of video client or other parameters relevant for the particular situation as the situation may be.

Thereupon, in a step 305, a value indicative of the quality of the received video signal is calculated. Depending on what the device is designed to generate as an output the value can be all or a subset of total quality, video quality and audio quality. The calculations performed in step 305 can differ for different applications and scenarios and will be described more closely below. Finally, in a step 307, the device outputs a result. For example, the video quality value may be presented as a numerical value such as a MOS. This value is then used as input data for optimizing the network or similar tasks.

In accordance with one preferred embodiment, the basic function of the model can be described with:

$$TOT\_MOS_{pred} = \text{func}(Qual_{encoding}, Qual_{buff}, Qual_{pl})$$

The base quality (quality of the encoding, $Qual_{encoding}$) can be described with a function:

$$y = c_0 - c_1 \cdot e^{-\lambda \cdot x}$$

where $c_0$, $c_1$ and $\lambda$ are constants. The constants have different values for different codecs.

$Qual_{buff}$ and $Qual_{pl}$ reduce the output MOS value based on initial buffering time, re-buffering percentage, re-buffering frequency and packet loss, respectively.

The packet loss effect for a logging period with packet loss can be expressed by:

$$Qual_{PL} = \text{const} * (Qual_{encoding} - 1) \cdot \xi + 1$$

where the factor $\xi$ is defined as $$\xi = \frac{PLR_u - PLR_{mean}}{PLR_u - PLR_l}$$

in which, $PLR_u$ and $PLR_l$ are the upper and lower packet loss rate limits respectively and $PLR_{mean}$ is the average packet loss rate of the current logging window; hence $0 \leq \xi \leq 1$ $$PLR_{mean} = \frac{1}{N} \cdot \sum_{i=1}^{N} PLR_i$$

For packet loss a lower and upper limit can be defined, based on subjective tests. Packet loss rate (PLR) lower than the lower limit are then counted as non-visible and will hence not affect the MOS value. At the other end of the scale, a PLR equal to or above the upper limit are per default set to be equally very bad (worst) quality. Thus, the following restrictions are applied on the instant PLR values:

$PLR_i = \min(PLR_j, PLR_u)$, and $PLR_i = \max(PLR_j, PLR_l)$

Adding re-buffering and initial buffering effect on quality is then for example done by:

$\Delta \text{TOT\_MOS}_{pred} = \text{Qual}_{PL} - \text{QUAL}_{buff}$ and $\text{Qual}_{buff}$ is calculated by:

$\text{Qual}_{buff} = C_0 + C_1 \cdot \text{INIT\_PERC} + C_2 \cdot \text{BUF\_PERC} + C_3 \cdot \text{BUF\_FRQ}$, and Where the variables are:
BUF_PERC: Re-buffering time/(playing time+rebuffering time+initial buffering)
INIT_PERC: Initial buffering time/(playing time+rebuffering time+initial buffering)
BUF_FRQ: Number of rebuffering events per minute
It may be that the effect of the packet loss rate, re-buffering and initial buffering is better modeled as a function:

$\Delta \text{TOT\_MOS}_{pred} = f(\text{Qual}_{PL}, \text{QUAL}_{buff})$, rather than a pure linear effect.

To handle severe packet losses and the effect on perceived quality high packet loss rates are preferably weighted higher than lower rates. To handle long re-buffering times the output MOS score may be truncated for very long re-buffering percentages. For example, 67% or higher re-buffering percent could be modeled to always result in the lowest video quality, e.g. MOS=1.

Using the invention a combination of input parameters can be used to estimate the complete video quality. One advantage of the invention is that only a small subset of parameters for a video sequence are required in order to generate a good video quality value. For example, the combination of interruptions (re-buffering) and packet loss can alone be used to estimate quality in addition with codec and bit-rate.

The invention is computational efficient due to the fact that the video images are not analyzed. The input parameters are few; still good video quality estimation can be obtained. The invention also takes into account the most important video quality degradation factors: coding quality and degradation due to transport errors. Coding quality estimation uses information about codec. Transport errors are essentially low throughput or packet loss. Low throughput might cause long initial buffering and re-buffering events. Packet losses will cause image and/or audio distortions and quality degradation due to temporal problems in the video.

The invention as described herein is, due to the fact that it is computational efficient, able to produce a video quality value in real-time. It is hence very well suited for test situations where a score must be produced in the moment of measurement.

In addition using the invention as described herein there is no need for exact synchronization as is the case solutions for based on a video image analysis, since a solution based on network parameters does not require a reference. Also, the calculated output, e.g. a MOS value, is not affected if the content is switched as would be the case in a model using image analysis.

The invention claimed is:

1. A method of determining multimedia quality, the method performed in a receiver and comprising the steps of:
   receiving a multimedia sequence comprising video and audio data;
   extracting one or more input parameters derived from a data transport layer and one or more video-streaming player parameters associated with the received multimedia sequence;
   generating a quality value corresponding to a subjective quality score of the multimedia sequence based on at least one of the extracted input parameters; and
   outputting the quality value as a measure of the quality of the received multimedia sequence;
   wherein the quality value is calculated as $\text{TOT\_MOS}_{pred} = \text{func}(\text{Qual}_{encoding}, \text{Qual}_{buff}, \text{Qual}_{pl})$,
   where $\text{Qual}_{encoding}$ is a measure of the quality of video encoding;
   $\text{Qual}_{buff}$ is a measure of the impact on the quality value of initial buffering time, re-buffering percentage, and re-buffering frequency; and
   $\text{Qual}_{pl}$ is a measure of the impact on the quality value of packet loss.

2. The method of claim 1, wherein the one or more input parameters comprise parameters corresponding to a codec used to encode the multimedia sequence.

3. The method of claim 2 wherein the parameters corresponding to a codec are constants $c_0$, $c_1$, and $\lambda$, the values of which depend on the codec, and wherein $\text{Qual}_{encoding}$ is calculated as $\text{Qual}_{encoding} = c_0 - c_1 e^{-\lambda x}$.

4. The method of claim 1, wherein the generated quality value corresponds to a Mean Opinion Score (MOS) value.

5. The method of claim 1, wherein the quality value is generated for one or more of a total quality, a video quality, and an audio quality.

6. The method of claim 1, wherein the multimedia sequence is received over a radio network.

7. The method of claim 1, wherein the one or more input parameters are derived or estimated from other parameters.

8. The method of claim 1 wherein $\text{Qual}_{pl}$ for a logging period with packet loss is calculated as $\text{Qual}_{pl} = \text{const} \cdot (\text{Qual}_{encoding} - 1) \cdot \xi + 1$ where $\xi$ is a factor defined as $$\xi = \frac{PLR_u - PLR_{mean}}{PLR_u - PLR_l}$$

where
   $PLR_u$ and $PLR_l$ are the upper and lower packet loss rates, respectively, and
   $PLR_{mean}$ is the average packet loss rate of the current logging window.

9. The method of claim 8 wherein $$PLR_{mean} = \frac{1}{N}\sum_{i=1}^{N} PLR_i,$$

, where
is an integer iteration variable,
$PLR_i$ is the packet loss rate for the i-th packet logging period, and
N is a number of iterations i of packet logging periods within a packet logging window.

10. The method of claim 9 wherein the values $PLR_i$ in the summation are constrained by $PLR_i$=min($PLR_i$,$PLR_u$) and $PLR_i$=max($PLR_i$,$PLR_l$).

11. The method of claim 1 wherein $\Delta TOT\_MOS_{pred}$=$Qual_{pl}$-$Qual_{buff}$, where $\Delta TOT\_MOS_{pred}$ is a change in the metric $TOT\_MOS_{pred}$.

12. The method of claim 11 wherein $Qual_{buff}$=$C_0$+$C_1$·INIT__PERC+$C_2$·BUF__PERC+ $C_3$·BUF_FREQ where $C_0$, $C_1$, $C_2$, and $C_3$ are constants,
BUF_FREQ is the number of rebuffering events per minute, $$BUF\_PERC = \frac{\text{Rebuffering time}}{(\text{playing time} + \text{rebuffering time} + \text{initial buffering})}, \text{ and}$$

$$INIT\_PERC = \frac{\text{Initial buffering time}}{(\text{playing time} + \text{rebuffering time} + \text{initial buffering})}.$$

13. The method of claim 1 wherein $\Delta TOT\_MOS_{pred}$=func($Qual_{pl}$,$Qual_{buff}$), where $\Delta TOT\_MOS_{pred}$ is a change in the metric $TOT\_MOS_{pred}$.

14. The method of claim 13 wherein, in the calculation of $Qual_{buff}$, higher packet loss rates are weighted higher than low packet loss rates.

15. The method of claim 13 wherein a 67% or higher rebuffering rate results in $TOT\_MOS_{pred}$ assuming the lowest allowed value.

16. A device operative to receive a multimedia sequence, and further operative to determine multimedia quality comprising:
a multimedia streaming device configured to:
receive a multimedia sequence comprising video and audio data; and
extract one or more input parameters derived from a data transport layer and video-streaming player parameters associated with the received multimedia sequence; and
a multimedia quality model device communicatively connected to the multimedia streaming device, and configured to:
generate a quality value corresponding to a subjective quality score of the multimedia sequence based on at least one of the extracted input parameters; and
output the quality value as a measure of the quality of the received multimedia sequence;
wherein the quality value is calculated as $TOT\_MOS_{pred}$=func($Qual_{encoding}$,$Qual_{buff}$,$Qual_{pl}$), where $Qual_{encoding}$ is a measure of the quality of video encoding;
$Qual_{buff}$ is a measure of the impact on the quality value of initial buffering time, re-buffering percentage, and re-buffering frequency; and
$Qual_{pl}$ is a measure of the impact on the quality value of packet loss.

17. The device of claim 16, wherein the one or more input parameters comprise parameters corresponding to a codec used to encode the received multimedia sequence.

18. The device of claim 17 wherein the parameters corresponding to a codec are constants $c_0$, $c_1$, and $\lambda$, the values of which depend on the codec, and wherein $Qual_{encoding}$ is calculated as $Qual_{encoding}$=$c_0$-$c_1 e^{-\lambda x}$.

19. The device of claim 16, wherein the generated quality value corresponds to a Mean Opinion Score (MOS) value.

20. The device of claim 16, wherein the multimedia quality model device is configured to generate the quality value for one or more of a total quality, a video quality, and an audio quality.

21. The device of claim 16, wherein the device comprises a portable device, and is configured to receive the multimedia sequence over a radio network.

22. The device of claim 16 wherein the one or more input parameters are derived from or estimated from other parameters.

23. The device of claim 16 wherein $Qual_{pl}$ for a logging period with packet loss is calculated as $Qual_{pl}$=const·($Qual_{encoding}$-1)·ξ+1 where ξ is a factor defined as $$\xi = \frac{PLR_u - PLR_{mean}}{PLR_u - PLR_l}$$

where
$PLR_u$ and $PLR_l$ are the upper and lower packet loss rates, respectively, and
$PLR_{mean}$ is the average packet loss rate of the current logging window.

24. The device of claim 23 wherein $$PLR_{mean} = \frac{1}{N}\sum_{i=1}^{N} PLR_i,$$

where
i is an integer iteration variable,
$PLR_i$ is the packet loss rate for the i-th packet logging period, and
N is a number of iterations i of packet logging periods within a packet logging window.

25. The device of claim 24 wherein the values $PLR_i$ in the summation are constrained by $PLR_i$=min($PLR_i$,$PLR_u$) and $PLR_i$=max($PLR_i$,$PLR_l$).

26. The device of claim 16 wherein $\Delta TOT\_MOS_{pred}$=$Qual_{pl}$-$Qual_{buff}$, where $\Delta TOT\_MOS_{pred}$ is a change in the metric $TOT\_MOS_{pred}$.

27. The device of claim 26 wherein $$Qual_{buff} = C_0 + C_1 \cdot INIT\_PERC + C_2 \cdot BUF\_PERC + C_3 \cdot BUF\_FREQ$$

where $C_0$, $C_1$, $C_2$, and $C_3$ are constants,

BUF_FREQ is the number of rebuffering events per minute, $$BUF\_PERC = \frac{\text{Rebuffering time}}{(\text{playing time} + \text{rebuffering time} + \text{initial buffering})}, \text{ and}$$

$$INIT\_PERC = \frac{\text{Initial buffering time}}{(\text{playing time} + \text{rebuffering time} + \text{initial buffering})}.$$

28. The device of claim 16 wherein $$\Delta TOT\_MOS_{pred} = \text{func}(Qual_{pl}, Qual_{buff}), \text{ where}$$

$\Delta TOT\_MOS_{pred}$ is a change in the metric $TOT\_MOS_{pred}$.

29. The device of claim 28 wherein, in the calculation of $Qual_{buff}$, higher packet loss rates are weighted higher than low packet loss rates.

30. The device of claim 28 wherein a 67% or higher rebuffering rate results in $TOT\_MOS_{pred}$ assuming the lowest allowed value.

* * * * *

UNITED STATES PATENT AND TRADEMARK OFFICE
CERTIFICATE OF CORRECTION

PATENT NO.        : 8,339,976 B2
APPLICATION NO.   : 12/443712
DATED             : December 25, 2012
INVENTOR(S)       : Gustafsson et al.

Page 1 of 1

It is certified that error appears in the above-identified patent and that said Letters Patent is hereby corrected as shown below:

On the Title Page, in Item (75), under "Inventors", in Column 1, Line 2,
delete "Luleå (SE);" and insert -- Trondheim (NO); --, therefor.

In the Claims:

In Column 7, Line 6, in Claim 9, delete ", where" and insert -- where --, therefor.

In Column 7, Line 7, in Claim 9, delete "is an" and insert -- I is an --, therefor.

In Column 7, Line 12, in Claim 9, delete "window." and insert the same at
Line 11, after "packet logging" as a continuation.

Signed and Sealed this
Fourth Day of June, 2013

Teresa Stanek Rea
*Acting Director of the United States Patent and Trademark Office*